May 2, 1967

H. L. DRYDEN, DEPUTY
ADMINISTRATOR OF THE NATIONAL
AERONAUTICS AND SPACE
ADMINISTRATION 3,317,180

HIGH PRESSURE REGULATOR VALVE

Filed April 9, 1963

INVENTOR.
WILLIAM F. MACGLASHAN, JR
BY
ATTORNEYS

INVENTOR.
WILLIAM F. MACGLASHAN, Jr
ATTORNEYS

United States Patent Office 3,317,180
Patented May 2, 1967

3,317,180
HIGH PRESSURE REGULATOR VALVE
Hugh L. Dryden, Deputy Administrator of the National Aeronautics and Space Administration, with respect to an invention of William F. MacGlashan, Jr., Pasadena, Calif.
Filed Apr. 9, 1963, Ser. No. 271,821
2 Claims. (Cl. 251—61)

This invention relates to high pressure regulator valves, and included in the objects of this invention are:

First, to provide a high pressure regulator valve employing diaphragms which are fully supported at their low pressure sides by yieldable disks in such a manner that, on flexure of the diaphragms, localized stresses are avoided, and wherein the diaphragms may be extremely thin.

Second, to provide a high pressure regulator valve wherein a seat-engaging element is interposed between the diaphragm and the valve seat to permit use of a knife-edge valve seat and an extremely thin diaphragm without damage to the diaphragm.

Third, to provide a high pressure regulator valve wherein the unbalanced load acts only on a stem of extremely small diameter so that a regulator spring having moderate force may be utilized for a selected range of high pressures.

Fourth, to provide a high pressure regulator valve which utilizes a knife-edge seat and wherein the force exerted thereby on its seat is limited to the sensing force acting on a predetermined small area substantially less than the diaphragm area of the regulator valve.

With the above and other objects in view, as may appear hereinafter, reference is directed to the accompanying drawings in which.

Figure 1:
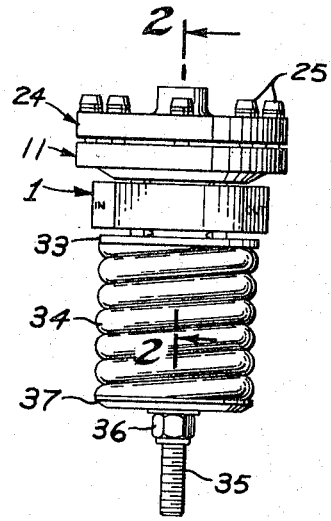
FIGURE 1 is a side view of the high pressure regulator valve.

The high pressure regulator valve includes a valve body 1 having a recess in one end forming a valve chamber 2. Centered in the recess is an inlet passage 3 which terminates in a raised valve seat 4 having a knife edge. An outlet passage 5 communicates with the valve chamber 2 at one side of the inlet passage 3.

The upper surface of the valve body 1 is provided with a shallow counterbore in which the valve chamber 2 is centered so as to form an annular clamping shoulder on which rests a diaphragm 6 covering the valve chamber 2.

Loosely retained between the diaphragm 6 and the valve seat 4 is a valve element 7 having a central seal pad 8 which engages the valve seat 4. The valve element 7 is centered in the valve chamber 2 by means of radiating legs 9. Pins 10 prevent rotation of the valve element in the valve chamber 2.

The upper end of the valve body 1 is covered by a retainer disk 11 having a rudimentary boss 12 which enters the counterbore and clamps the periphery of the diaphragm 6. The retainer disk 11 is held in place by a ring of screws 13, extending upwardly through the valve body 1 into the valve disk 11.

The retainer disk 11 is provided with a central bore 14 which receives a valve-operating stem 15 having a reduced lower end 16 adapted to engage the diaphragm 6 at its upper side opposite from the seal pad 8 of the valve element 7. The retainer disk 11 is provided with a shallow recess 17 surrounding the lower end of the stem 15. The recess 17 is completely filled with a stress-distributing disk 18 formed of rubber or other essentially noncompressible but elastic material.

The upper side of the retainer disk 11 is provided with a cavity 19 of relatively large diameter which slidably receives a pressure plate 20. The pressure plate 20 is provided with a bore in alignment with the bore 14 in the retainer disk 11, and is recessed at its upper side to receive a flanged head 21 formed at the upper end of the stem 15.

The upper portion of the cavity 19 is provided with a shallow counterbore which receives the margins of a stress-distributing disk 22 overlying the pressure plate 20. The stress-distributing disk 22 is formed of rubber or other essentially noncompressible elastomer.

A second diaphragm 23 of substantially larger area than the diaphragm 6 overlies the upper surface of the retainer disk 11, and is clamped at its margins by means of a cover plate 24 secured to the retainer disk 11 by a ring of screws 25. The cover plate 24 is provided with a shallow recess above the diaphragm 23 so as to form therewith a pressure chamber 26.

The upper wall of the pressure chamber 26 is provided with a shallow depending central boss forming a stop 27. The upper side of the cover 24 is provided with a central boss having a screw-threaded bore forming an inlet socket 28. The lower end of the inlet socket 28 is provided with diverging ports 29 communicating with the pressure chamber 26.

The valve body 1 and retainer disk 11 are provided with a ring of aligned bores which receive pins 30, the upper ends of which are adapted to bear against the underside of the pressure plate 20. The lower ends of the pins 30 project below the valve body 1. This end of the valve body is provided with a guide stem 31 of reduced diameter, which is surrounded by a sleeve 32 having a flange 33 at its upper end engageable with the lower ends of the pins 30. A regulator spring 34 surrounds the sleeve 32, and its upper end bears against the flange 33.

A screw shaft 35 extends downwardly from the stem 31 and receives a nut 36 and cap plate 37. The cap plate engages the underside of the regulator spring 34 and the nut 36 serves to adjust the force exerted by the regulator spring 34. This force is transmitted through the pins 30 to the pressure plate 20.

Figure 2:
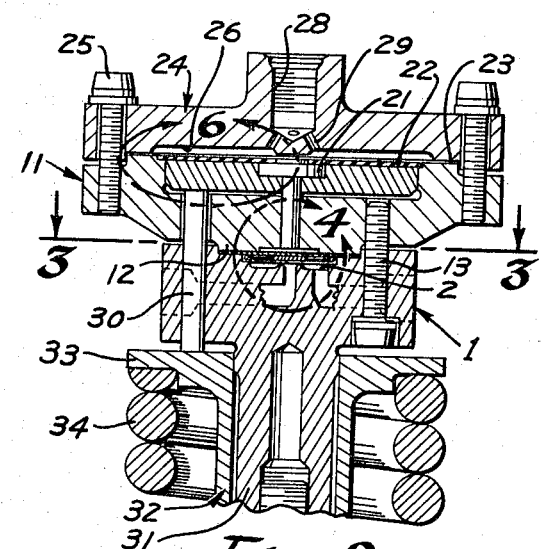
FIGURE 2 is an enlarged, fragmentary, sectional view taken through 2—2 of FIGURE 1.
Figure 3:
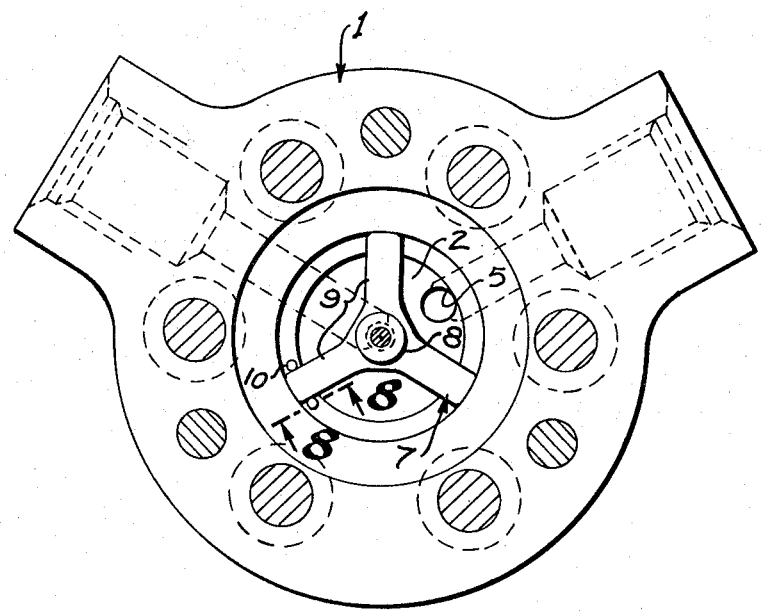
FIGURE 3 is a further enlarged, transverse, sectional view taken through 3—3 of FIGURE 2.

Operation of the high pressure regulator valve is as follows:

Regulating pressure fluid is applied to the upper side of diaphragm 23 to force the diaphragm downwardly against the action of the regulator spring 34. In doing so, the stem 15 is forced downwardly against the diaphragm 6, forcing the valve element 7 toward the valve seat 4. It is to be understood that the flanged head 21 and the stem 15, FIG. 2, forms a unitary motion transmitting member for applying to the diaphragm 6, the valve element 7 and pad 8, a pressure or force dictated by the surface area of the flanged head 21. Since the surface area of the pressure plate or support member 20 is greater than that of the flanged head 21, the pressure or force applied to the spring 34 will necessarily be of a greater magnitude than that applied through the stem 15 as pad 8 is seated. Therefore, the valve element 7 will be substantially protected from the crushing effects initiated by pressure overloads, even through the spring 34 will accommodate an additional pressure initiated displacement of the plate 20.

Figure 4:
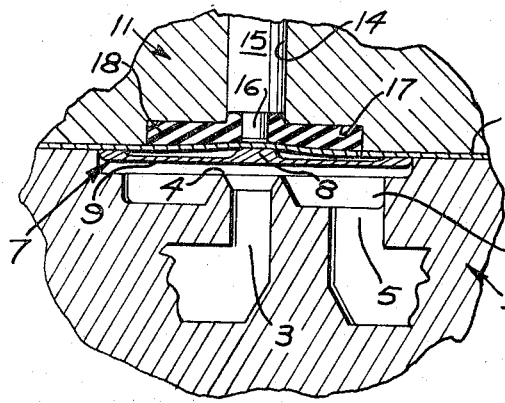
FIGURE 4 is an enlarged, sectional view taken within circle 4 of FIGURE 2, showing the valve in its open position.
Figure 5:
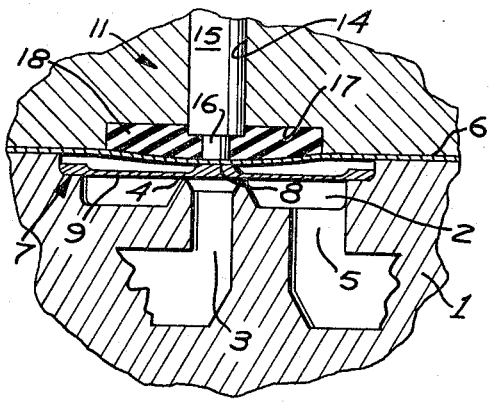
FIGURE 5 is a similar fragmentary, sectional view showing the valve in its closed position.

Reference is now directed particularly to FIGURES 4 and 5. When the valve is in its fully opened position, as shown in FIGURE 4, the stress-distributing disk 18 is compressed between the stem 15 and the diaphragm 6, and prevents the diaphragm 6 from bending sharply at the peripheries of the recess 17, instead the diaphragm curves upwardly in a smooth curve.

When stem 15 is depressed, as shown in FIGURE 5, a portion of the stress-distributing disk 18 is displaced by the shoulder, formed by the reduced end 16, as it moves into the recess 17. This displacement causes the stress-distributing disk 18 to assume a convex surface fully supporting the valve covering or sealing diaphragm 6, for thereby obviating stress concentration in the diaphragm.

Figure 6:
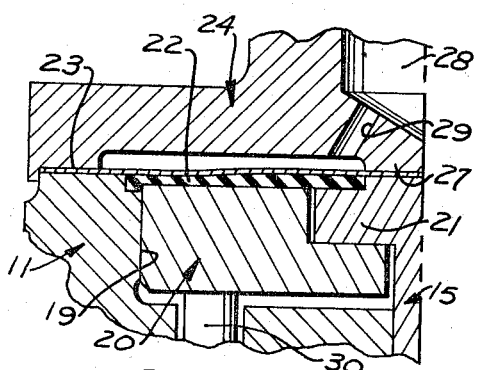
FIGURE 6 is a fragmentary, sectional view taken through 6—6 of FIGURE 2, showing the valve in its open position.
Figure 7:
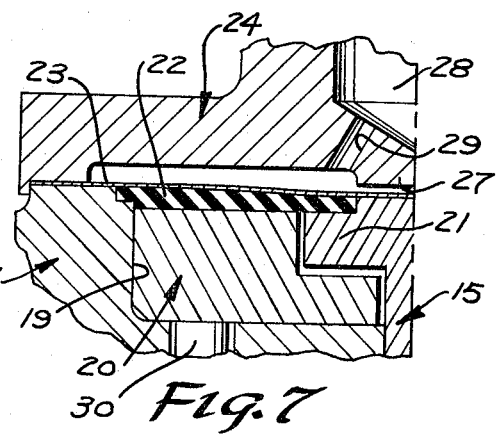
FIGURE 7 is a similar sectional view showing the valve in its closed position.
Figure 8:
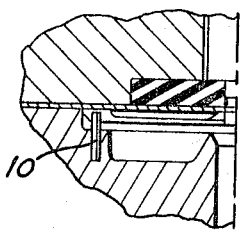
FIGURE 8 is a fragmentary, sectional view taken through 8—8 of FIGURE 3, illustrating means for restraining circumferential movement of the valve element.

Similarly, with reference to FIGURES 6 and 7, the stress-distributing disk 22 bridges between the periphery of the pressure plate 20 and surrounding walls of the retainer disk cavity 19, so that the diaphragm 23 curves gradually from its peripheral portion to its central portion with no regions of stress concentration.

It should be noted that the underside of the pressure plate 20 is exposed to atmospheric pressure or ambient pressure.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. In a high pressure regulator valve of the type including a valve chamber having an inlet and an outlet port with a raised knife-edge seat disposed therebetween, and a valve closing element adapted to be forced into valve sealing engagement with the knife-edge seat in response to a convexing deflection of a valve-sealing diaphragm disposed in contiguous relationship with the element, the improvement comprising in combination;
    (a) a retainer disk including means defining a first and a second concentric cavity disposed at opposite sides of the disk and a coaxially aligned valve bore extending between the cavities;
    (b) means mounting said retainer adjacent the valve-sealing diaphragm in a manner such that the diaphragm is disposed across the first concentric cavity of said retainer;
    (c) a support member seated for axial displacement in the second cavity of said retainer including means defining therein a bore extending in coaxial alignment with said valve bore;
    (d) a flexible pressure diaphragm extended across said second cavity;
    (e) an open-faced fluid chamber having an open face mounted on said retainer disk in a manner such that the flexible pressure diaphragm is caused to be extended across the open face of the fluid chamber and between the fluid chamber and the second cavity of the retainer disk;
    (f) means defining within the support member a counter bore disposed at one end of the bore adjacent the flexible pressure diaphragm;
    (g) a rigid piston-shaped motion transmitting member having a disk-shaped head seated in the counter bore of the support member, and a cylindrical stem extending through the coaxially aligned bores of support member and retainer disk and terminating within said first cavity in driving engagement with the valve-sealing diaphragm, whereby axial displacement imparted to the motion transmitting member in a valve-closing direction is caused to be imparted to the valve-sealing diaphragm and valve-closing element, for thereby causing the element to seat on the knife-edge seat as the valve-sealing diaphragm is caused to deflect in a convexing mode;
    (h) biasing means including at least one spring member knife-edge seat as the valve-sealing diaphragm is with the flexible pressure diaphragm; and
    (i) bias adjusting means connected with the biasing means whereby as a pre-selected fluid pressure is established in the fluid chamber the flexible diaphragm is caused to deform toward the support member and the motion transmitting member to thus displace the support member independently of displacement imparted to the motion transmitting member by the flexible diaphragm and against the biasing means with a force greater than the force applied to the valve closing element as it is forced by the motion transmitting member into sealing engagement with the knife-edge seat.

2. In the regulator set forth in claim 1:
    (a) means defining a shoulder portion near the extending end of the cylindrical stem; and
    (b) an essentially incompressible, distortable member substantially filling the first cavity of the retainer disk, whereby the member is caused to be distorted and displaced by displacement of the shoulder as the cylindrical stem is displaced to thereby distribute the bending stresses thus created in said valve-seating diaphragm.

References Cited by the Examiner

UNITED STATES PATENTS

| | | | |
|---|---|---|---|
| 2,610,819 | 9/1952 | Sutton | 251—61 X |
| 2,635,631 | 4/1953 | Seefluth et al. | 251—61 X |
| 2,663,121 | 12/1953 | Ramsey | 251—331 X |
| 2,893,423 | 7/1959 | Seney | 251—333 X |
| 2,925,986 | 2/1960 | Woods | 251—57 |

FOREIGN PATENTS 294,955   2/1954   Switzerland.

WILLIAM F. O'DEA, *Primary Examiner.*

I. WEIL, *Examiner.*

D. H. LAMBERT, *Assistant Examiner.*